July 11, 1967  W. C. CHRISTINE ET AL  3,330,311
MECHANISM FOR FILLING RECEPTACLES OR PACKETS WITH
DRY POWDERED MATERIAL
Filed Oct. 19, 1964  3 Sheets-Sheet 1

INVENTOR
WILLIAM C. CHRISTINE
JOSEPH E. PIERCE
BY Sherman Levy ATTORNEY

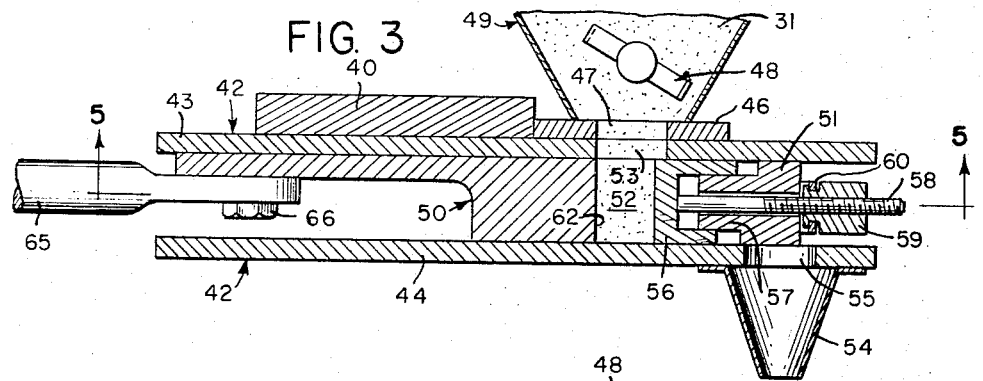
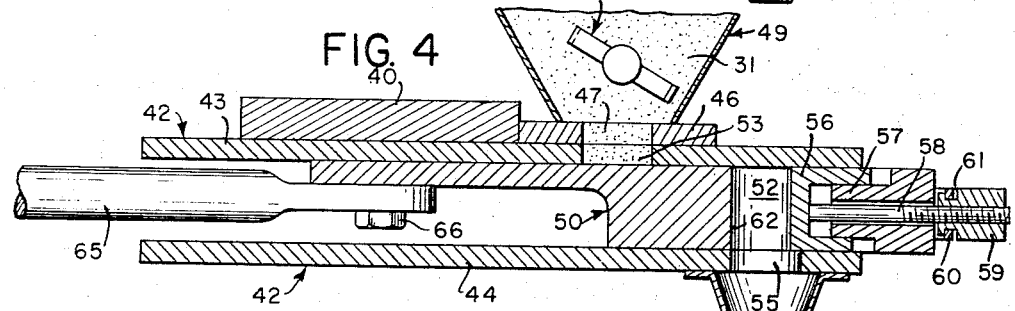
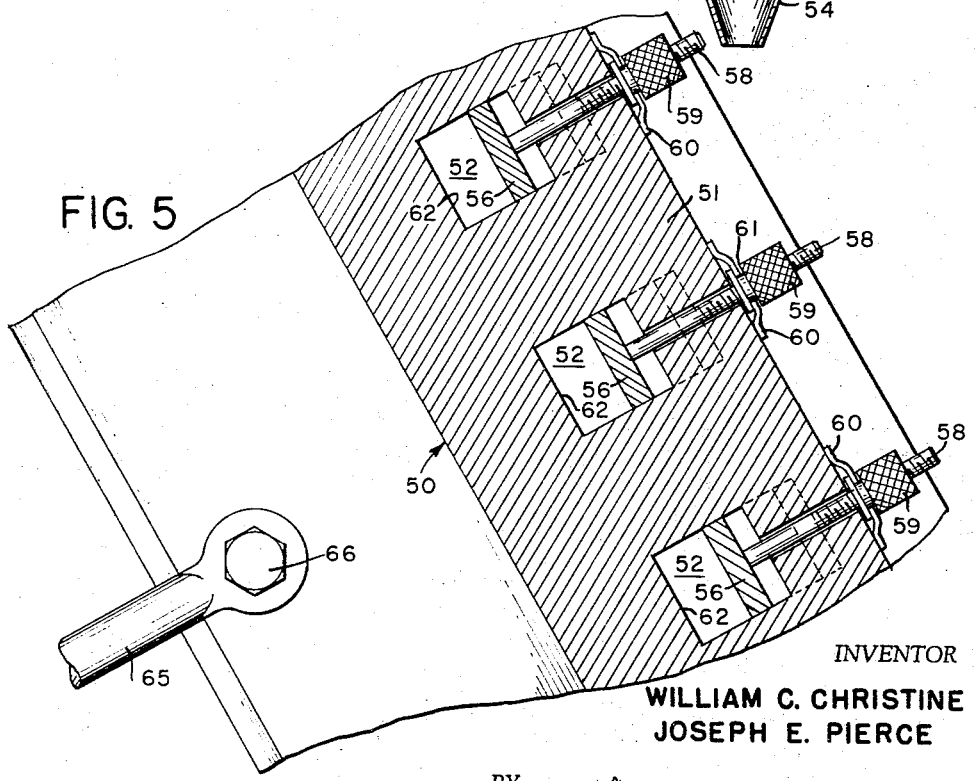

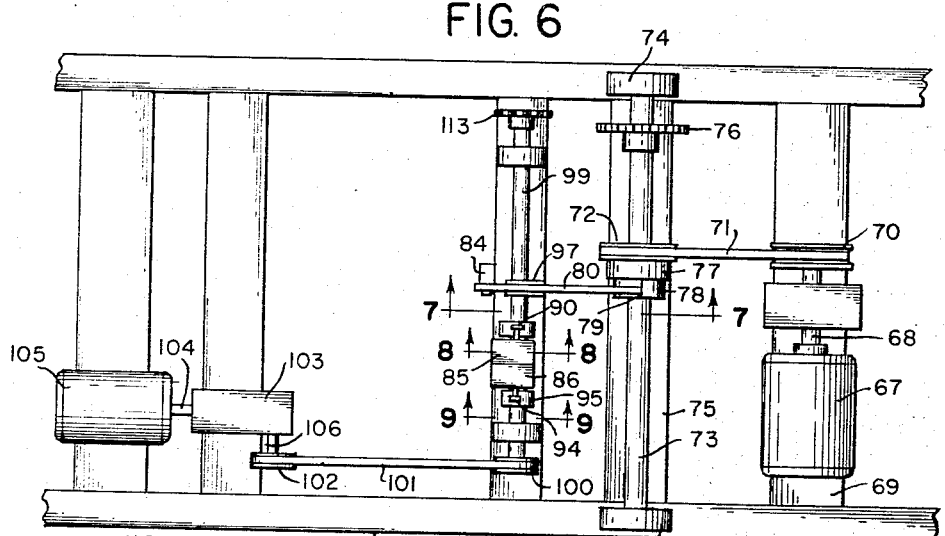

United States Patent Office 3,330,311
Patented July 11, 1967

3,330,311
MECHANISM FOR FILLING RECEPTACLES OR PACKETS WITH DRY POWDERED MATERIAL
William C. Christine, Catasauqua, and Joseph E. Pierce, Allentown, Pa., assignors to Allen Electronics, Inc., Allentown, Pa., a corporation of Pennsylvania
Filed Oct. 19, 1964, Ser. No. 404,893
1 Claim. (Cl. 141—167)

The present invention is directed to a filling mechanism for filling packets with dry products or dry powdered material, and wherein the packets or containers are automatically filled with a dry product such as a food product, the packets being filled with an exact or predetermined quantity of material and wherein after being filled, covers or closures are positioned on the filled packets or receptacles.

This invention relates to a mechanism for filling receptacles or packets with various types of material, and more particularly to a filling mechanism for filling such packets with dry products or powdered material.

The object of the invention is to provide a filling mechanism which is adapted to be used for automatically filling a plurality of packets or containers with a dry product such as a food product, and wherein the receptacles or packets are filled with an exact and predetermined quantity of material so that after the filling operation, suitable covers or closures can be positioned on the filled packets or receptacles.

A further object of the present invention is to provide a filling mechanism which includes a means for moving plates beneath a hopper which has discharge spouts, and wherein the plates are adapted to receive packets from a suitable source of supply, and wherein the packets or containers are arranged in alignment so that they move below discharge spouts of the hopper, and wherein with the present invention forward movement of the plates is temporarily halted and wherein the proper quantity of dry powdered product is automatically filled and dispensed into the containers or packets, and subsequently the packets are moved away from the position below the hopper and wherein this cycle of operation is continuous so as to permit a plurality of the receptacles or packets to be filled in the desired manner.

Still a further object of the present invention is to provide a filling mechanism for filling packets or containers with dry products, as for example when such products are to be used in making beverages or soups or the like in conjunction with vending machines or instant beverage machines or devices, and wherein according to the present invention the product or dry material is deposited in the containers at the desired speed and in the desired quantity, and wherein the device of the present invention is relatively inexpensive to manufacture and economical and foolproof in operation.

Additional objects, advantages and features of invention will be apparent from the following description considered in conjunction with the accompanying drawing, wherein:

FIG. 3 is an enlarged vertical sectional view of the filling mechanism taken on the line 3—3 of FIG. 2.

FIG. 4 is a view generally similar to FIG. 3 but showing the parts in a different or adjusted or moved position.

FIG. 5 is an enlarged sectional view taken on the line 5—5 of FIG. 3.

FIG. 6 is a fragmentary plan view illustrating the drive mechanism.

FIG. 7 is an enlarged sectional view taken on the line 7—7 of FIG. 6.

FIG. 8 is an enlarged sectional view taken on the line 8—8 of FIG. 6.

FIG. 9 is an enlarged sectional view taken on the line 9—9 of FIG. 6.

Referring in detail to the drawings, the numeral 30 indicates the filling mechanism of the present invention which is adapted to be used for filling rigid containers or packets such as the packets 32 with material such as the dry product 31, and the dry product 31 may be a powdered or dry food product such as instant coffee, tea, chocolate, soup or the like. After the packets or containers 32 are filled with the dry product 31, the containers 32 are adapted to have a suitable closure affixed thereto whereby the filled containers can be subsequently used for any desired purpose and, for example, such containers can be used in conjunction with vending machines of the type which vend packets of dry food products for mixing with hot water to provide soups, beverages and the like. Or, the filled containers can be used for other purposes such as in conjunction with instant beverage machines of the type which supply hot or cold water from a suitable source of supply. The containers 32 are adapted to be supplied from a suitable source of supply of a desired type.

Figure 1:
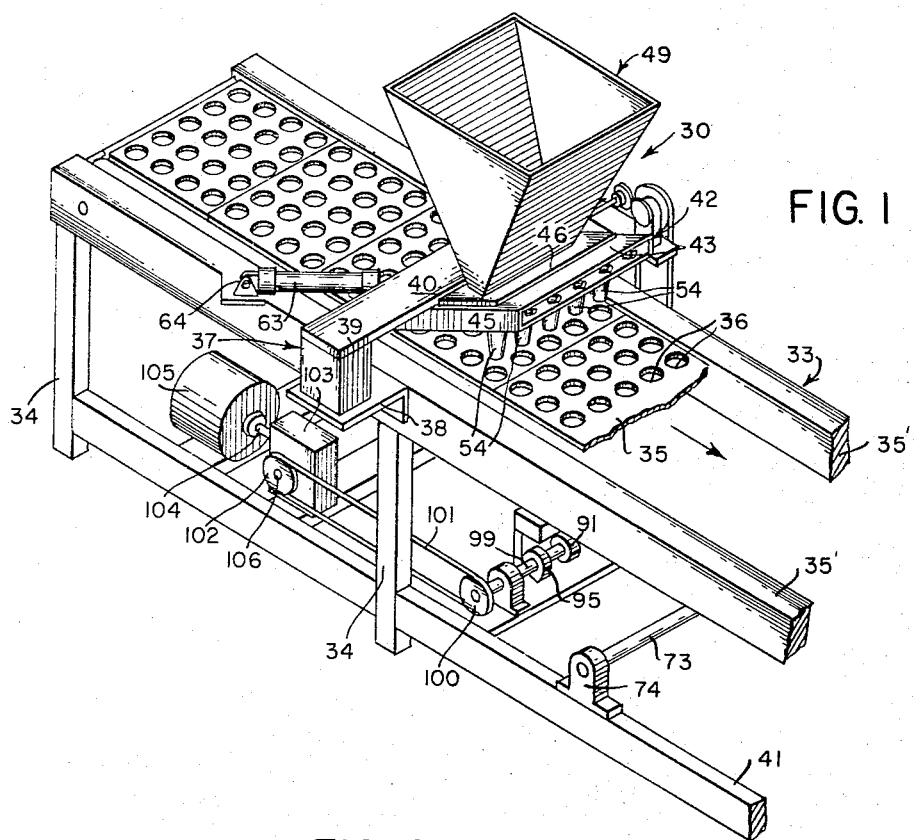
FIG. 1 is a fragmentary perspective view illustrating one application of the filling mechanism of the present invention.
Figure 2:
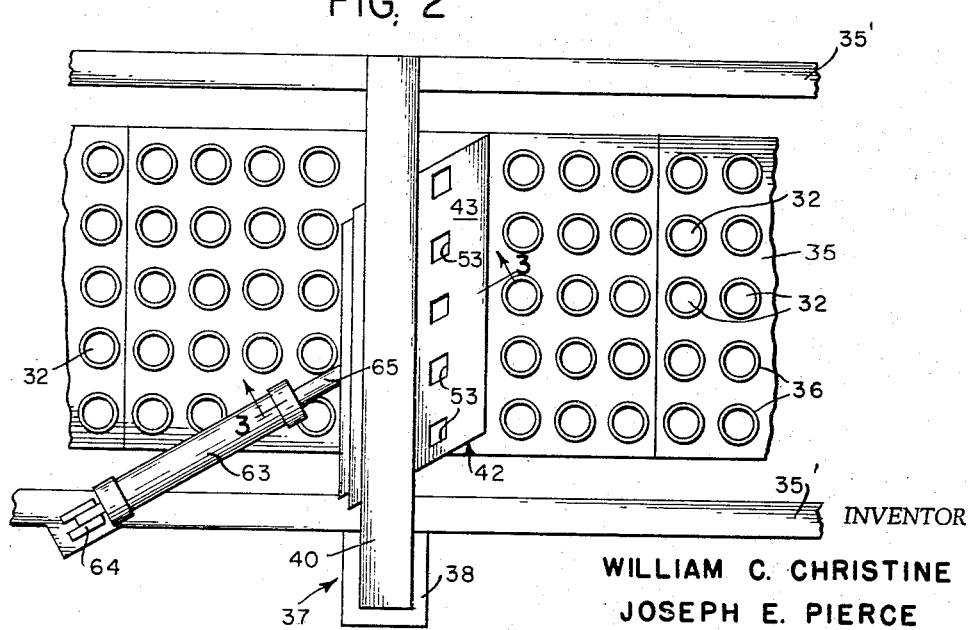
FIG. 2 is a top plan view of the filling mechanism with the hopper removed for clarity of illustration.

As shown in FIG. 1, the machine or mechanism 30 is adapted to include a suitable frame 33 which may have a suitable configuration and may include upstanding posts 34 as well as horizontal members 35' and 41. The numeral 35 indicates each of a plurality of movable flat plates which are mounted for movement or travel along the frame 33 by a suitable mechanism, and the plates 35 are provided with a plurality of apertures or openings 36, and each of the openings 36 are adapted to receive or hold a container or packet 32 therein. As shown in FIG. 1 each plate 35 has five rows of openings 36 but it is to be understood that the number of such rows can be varied as desired or required.

As shown in the drawings there is provided a support structure which is indicated generally by the numeral 37, and the support structure 37 includes end pieces 39 which are suitably mounted on brackets 38, and the brackets 38 may be affixed to the members 35' of the frame 33 in any suitable manner, as for example by welding, bolt and nut assemblies or the like. The numeral 40 indicates a cross piece which may extend between the end pieces 39 and which is suitably secured thereto, and the numeral 42 indicates a hollow housing which is suitably secured to or affixed to the cross piece 40, FIG. 3. The housing 42 includes spaced parallel top and bottom members or walls 43 and 44 as well as sides 45. The numeral 46 indicates a bar which is suitably mounted contiguous to the upper surface of the top member 43, and the bar 46 has a plurality of spaced apart openings or apertures 47 therein for a purpose to be later described. The numeral 48 indicates a rotary agitator or stirrer that is arranged within a hopper 49, and the hopper 49 is adapted to receive the dry product 31 from a suitable source of supply.

Movably mounted in the housing 42 is a body piece or plunger 50 which has an end piece 51 associated therewith, FIGS. 3 and 5. The numeral 52 indicates recesses or spaced apart chamber defined in the body piece 50, and there is provided in the top wall 43 a plurality of spaced apart openings 53 which register with the openings 47 in the bar 46 below the hopper 49. The numeral 54 indicates discharge spouts which depend from the bottom wall 44 of the housing 42 and which are suitably secured thereto, and the spouts 54 are adapted to correspond in number and location to the openings or rows of apertures 36 in the plate 35 whereby the packet 32 will be properly filled with the material 31 as the machine is actuated. Openings 55 in the bottom member 44 are arranged above the discharge spouts 54 to permit the material 31 to move downwardly by gravity.

There is further provided a means for varying the effective size of the recesses or chambers 52 so that the amount of product dispensed or discharged into the containers 32 can be accurately controlled or regulated as desired. This means comprises adjustable units or elements 56 which have a generally U-shape in cross-section as shown in FIG. 3 for coaction with shoulders 57, and studs or bolts 58 are adapted to have their inner ends secured to the elements 56 in any suitable manner as by welding. The studs 58 have threaded portions, and the numeral 59 indicates knurled securing elements or sleeves which are arranged in threaded engagement with the threaded portions of the studs 58 so that by manually turning the elements 59, the units 56 can be moved towards or away from the edge 62 of the body piece 50 whereby the effective size of the chamber 52 can be changed or varied as desired. Retainers 60 have portions arranged in engagement with grooved sections 61 of the members 59, and the retainers 60 are arranged as shown in the drawings.

The numeral 63 indicates a hollow cylinder which is adapted to have an end thereof connected as at 64 to the frame 33, FIG. 1, and a suitable piston is adapted to be movably positioned within the cylinder 63 whereby when the cylinder 63 is actuated as, for example, by means of hydraulic fluid or air under pressure, the piston rod 65 can be extended or retracted, and the piston rod 65 is connected as at 66 to the body piece 50, FIG. 4.

There is further provided a control mechanism or control means which includes a variable speed electric motor 67 that is adapted to be connected to a suitable source of electrical energy, and the motor 67 may be supported on a cross piece 69 of the frame 33, FIG. 6, there being a shaft 68 rotated by the motor 67, and the shaft 68 drives or rotates a pulley 70 which has an endless belt 71 arranged in engagement therewith, the belt 71 also being arranged in engagement with a pulley 72 that is mounted on a shaft 73, and the shaft 73 may be rotatably supported in bearings 74 above a cross piece 75. The numeral 76 indicates a sprocket which is driven by the shaft 73 and the sprocket 76 is adapted to be used for controlling movement of change or the like which regulates the movement or advancement of the plates 35. A mechanical clutch 77 is operatively connected to the shaft 73 contiguous to the pulley 72, and the numeral 78 indicates a ratchet which is adjacent the clutch 77, FIG. 7, and the ratchet 78 is provided with a dog or pawl 79. The numeral 80 indicates a bar or arm which is adapted to engage and coact with the dog 79 as shown in the drawings, and there is provided a spring member 81 for normally urging or biasing the arm 80 in a clockwise direction, FIG. 7, the spring 81 being suitably anchored to a portion of the frame as at 82. The arm 80 is adapted to be pivotally connected to a support piece 84 as at 83.

As shown in FIGS. 8 and 9, a pair of microswitches 85 and 86 are provided and these microswitches may be supported by elements such as the elements 87 and 88. The microswitch 85 has a movable finger 89 depending therefrom which is adapted to have an element such as a roller 90 on its lower end, and the roller 90 is adapted to be engaged by a shoulder 92 of a rotary cam 91. Similarly, the microswitch 86 has a depending finger 93 which carries a roller 94 that is actuated and engaged by a shoulder 96 of a rotary cam 95.

The numeral 97 indicates a cam which is rotatably mounted, and the cam 97 includes a shoulder or projection 98 which is adapted to selectively engage and actuate a pivotally mounted arm 80, FIG. 7, and the cams 91, 95 and 97 are mounted on a shaft 99, and the shaft 99 is adapted to have a pulley 100 on its end, there being an endless belt 101 arranged in engagement with the pulley 100, and the belt 101 also is arranged in engagement with a pulley 102 that is driven by a shaft 106. The shaft 106 is adapted to be rotated or driven from a gear box 103, and the numeral 104 indicates a stub shaft which is driven by a motor 105 for providing power for the unit or gear box 103.

As shown in FIG. 7, an endless belt or chain 107 is adapted to be driven by a sprocket or pulley 113 on the shaft 99, FIG. 6, and the member 107 is arranged in engagement with a pulley or sprocket 108 which is mounted on a shaft 109, and the shaft 109 is adapted to have a gear 110 thereon which meshes with a gear 111 on a shaft 112, the shaft 112 being operatively connected to the agitator or stirrer 48 in the hopper 49.

Also, as shown in FIG. 7, a pulley or sprocket 76 on the shaft 73 has an endless chain or belt 114 arranged in engagement therewith, and the belt or chain 114 is arranged in engagement with a pulley or sprocket 115 which is suitably mounted on a shaft 116, and the shaft 116 is suitably mounted or supported by the frame 33. The shaft 116 serves to drive a pulley or sprocket 117 which is adapted to have an endless chain or belt 118 connected thereto, and the belt 118 is used for moving the plates 35 and, for example, by this arrangement the plates 35 are advanced from left to right in FIG. 1 and when the plates 35 reach a position below the discharge spouts 54, the forward movement of the plates 35 is temporarily halted so that the containers 32 will be automatically filled with the proper quantity of dry powdered material such as dry powdered food products, and then after the containers 32 are filled with this dry material 31, forward motion of the plates 35 continues so that the entire cycle of operation is continuous.

In use, with the parts arranged as shown in the drawings, the plates 35 with the openings 36 therein are advanced from left to right in FIG. 1, and the openings 36 each have a container such as the container 32 therein, and these containers or packets 32 can be supplied to the plates from any suitable source of supply and in any desired manner. As the plates 35 are advanced along the frame 33, it will be seen that when the plates 35 reach a position such that a row of containers 32 are beneath the discharge spouts 54, the forward movement of the plates will be temporarily stopped or halted, and with the plates in stopped condition, the filling mechanism, which has been previously retracted, will advance to discharge the material 31 into the containers 32. The dry powdered material 31 in the hopper 49 is supplied to the hopper from any suitable source of supply, and the agitator 48 serves to stir or agitate the material 31 so that the material can drop by gravity down through the openings 47 and registering openings 53 and when the parts are in the position of FIG. 3, this material 31 will be received in the plurality of chambers or recesses 52.

Forward motion of the plates 35 with the containers is controlled by means of the variable speed motor 67 and because the motor 67 is capable of variable speeds, the speed with which the containers are moved and filled can be regulated or varied as desired. The motor 67 drives the shaft 68 which turns the sprocket or pulley 70 which in turn moves the belt 71, and the belt 71 engages the pulley 72 on the shaft 73 so that actuation of the motor 67 results in rotation of the shaft 73. The shaft 73 has the clutch 77 thereon, and the clutch 77 is of a type that prevents rotation of the shaft 73 as long as the end of the bar 80 engages the dog 79 of the ratchet 78 as shown in FIG. 7. However, when the bar 80 is pivoted or raised upwardly about its pivot 83 so that the end of the bar 80 can clear the dog 79, the clutch 77 will cause the shaft 73 to be driven by means of the parts such as the parts 72, 71, 70, 68 and motor 67. This bar or lever 80 is normally urged or biased downwardly or in a clockwise direction, FIG. 7, by means of the spring 81, and the bar 80 is raised upwardly or biased in a counterclockwise direction by means of the cam 97 on the shaft 99. The cam 97 includes the shoulder or eccentric portion 98 which raises the bar 80 or pivots the bar 80 about its pivot point 83 on each single revolution of the cam 97 on the shaft 99, and the shaft 99 is driven or rotated from the motor 105, and the motor 105 accomplishes this by means of a drive mechanism such as the shaft 104, gear box 103, shaft 106, pulley 102, belt 101, and pulley 100, FIG. 6.

The shaft 99 also has the pair of eccentric cams 91 and 95 affixed thereto or mounted thereon, FIGS. 8 and 9, and these cams 91 and 95 have eccentric shoulders 92 and 96 which actuate the microswitches 85 and 86 once during each revolution of the shaft 99. This actuation of the microswitches 85 and 86 is accomplished through the medium of the rollers or fingers 90 and 94 which are pivotally connected to members 89 and 93, and the microswitches 85 and 86 are of conventional construction and these microswitches are operatively connected to the cylinder 63 in such a manner that the microswitches control the supply of actuating medium such as air under pressure, hydraulic fluid or the like to the cylinder 63. Thus, one microswitch causes the rod 65 to be advanced while the other microswitch causes retraction of the piston rod 65, and since the rod 65 is connected as at 66 to the body piece 50 which is reciprocally mounted in the housing 42, it will be seen that this results in movement of the parts to and from the positions shown in FIGS. 3 and 4.

In operation, the clutch 77 is mounted on the shaft 73 and hence is rotated from the motor 67 and this rotation of the shaft 73 continues until the dog 79 of the ratchet 78 engages the end of the arm 80 as shown in FIG. 7 at which time with the parts in the position of FIG. 7, further rotation of the shaft 73 is temporarily halted, and this causes the belt 114 to temporarily halt and at the same time this therefore causes the shaft 116 to temporarily halt or stop rotating so that the belt 118 will temporarily stop moving and because the belt 118 serves to advance or move the plates 35, it will be seen that when the parts are in the position of FIG. 7, the plates 35 will temporarily stop moving and at this time a row of containers 32 will be in alignment beneath the discharge spouts 54.

Meantime, the shaft 99 is being rotated from the motor 105 and since rotation of the shaft 99 first causes the cam 91 to actuate the micro switch 85, then the micro switch 85, upon actuation, controls the air under pressure or hydraulic fluid being supplied to one end of the cylinder 63 so that the body piece 50 is moved to retracted position as shown in FIG. 3 whereby the recesses or chambers 52 can receive a supply of powdered product 31 from the hopper 49. Then, the cam 95 will operate the micro switch 86 to control the actuating medium being supplied to the other end of the cylinder 63 so that the rod 65 will be advanced from the position shown in FIG. 3 to the position shown in FIG. 4 whereby the material 31 in the chambers 52 will be moved forwardly so that it can drop downwardly by gravity through the openings 55 and down through the discharge spouts 54 into the containers 32. It will be seen that when the parts are in the position of FIG. 3, the chambers 52 are in alignment or registry with the openings 53, and 47 whereby these chambers 52 can receive a charge of material 31 from the hopper 49, but with the parts in the position of FIG. 5, the openings 53 are blocked off by the top of the body piece 50, and with the parts in the position of FIG. 4, the body piece 50 is advanced so that the chambers 52 register with the openings 55 and discharge spouts 54 whereby the material can drop down through the openings 55 and down through the spouts 54 into the containers 32 which are in a temporarily halted position beneath the spouts 54. Then, as the shaft 92 continues to rotate, the cam 97 will turn so that the eccentric 98 will raise the arm 80 to permit the plates to move. With the present invention a plurality of cups or packets 32 can be easily and quickly filled with a predetermined and exact quantity of material such as the dry powdered food product 31. The plates 35 with the packets 32 advance until a row of the packets 32 are beneath the row of discharge spouts 54 and then advancing movement of the plates and packets is temporarily halted so that it will be seen that the plates and packets move ahead step by step intermittently and when the packets are beneath the spouts 54, forward motion is stopped. Then, after the packets 32 are filled with the material 31, forward movement of the plates and packets again continues so that subsequently closures or tops are adapted to be automatically placed on the packets and the filled packets can then be placed in suitable receptacles or containers for subsequent use in the desired manner.

With the parts in the position shown in FIG. 4 for example, when a micro switch is engaged by having its roller actuated by the proper cam on shaft 99, air, hydraulic fluid or the like will then retract the piston rod 65 in the cylinder 63 to return the parts from the position shown in FIG. 4 to the position shown in FIG. 3 so that the recesses 52 can again be filled from the hopper 49 and this cycle continues.

It is to be noted that the recesses or chambers 52 are of variable size, that is by adjusting the members 59 on the bolts or studs 58, the units 57 will move towards or away from the surface 62 of the body piece 50 whereby the recesses or chambers 52 can be made larger or smaller and this provides a means for controlling the amount of material that is automatically filled or discharged into the respective packets 32.

In the present invention, it will be seen that there has been provided a novel and efficient filling mechanism which is especially suitable for filling packets such as the packets 32 with dry products such as dry powdered food products 31, and the present invention includes the parts such as the housing 42 and body piece 50 and associated parts, as well as the control mechanism including the motors 105, 67, and cams and associated parts as previously described.

The packets 32 are adapted to be filled with powdered products such as powdered coffee, tea, chocolate, soups, beverage mixes or the like, and wherein such packets can subsequently be used in any desired manner and, for example, such packets can be dispensed from coin operated vending machines or else they can be used in formulating or making beverages or food products by using hot or cold water provided from an instant beverage device or unit, or the filled packets can be used for other purposes.

The parts can be made of any suitable material and in different shapes or sizes.

With the present invention dry products can be positioned in rigid containers or packets, and the present invention is constructed so that the product can be dispensed or deposited at any desired speed and at any desired point in the packets or receptacles, and while heretofore machines have been devised for filling receptacles with liquid or fluid type materials, the prior devices have not been able to efficiently fill receptacles or packets with dry powdered material. The plurality of different types of materials or products can be deposited in the packets as desired.

Minor changes in shape, size and rearrangement of details coming within the field of invention claimed may be resorted to in actual practice, if desired.

What is claimed is:

A filling mechanism for filling packets with dry product comprising a frame, plates mounted for movement along said frame and said plates having openings therein for receiving packets which are to be filled, a support structure connected to said frame, a housing affixed to said support structure, a body piece reciprocally mounted in said housing, a hopper supported above said housing, said body piece having a plurality of chambers therein, discharge spouts depending from said housing and said discharge spouts being arranged in alignment with the rows of openings in the plates, the chambers in the body piece being defined by an end surface of the body piece and movable units, and said movable units having rods connected thereto, adjustable knurled elements connected to said rods, a cylinder having one end connected to said frame, a piston rod adjustably mounted in said cylinder and connected to said body piece, a control means including a variable speed motor having a first shaft driven thereby, a second shaft mounted in said frame and driven from said first shaft, a clutch on said second shaft, a ratchet on said second shaft, a spring pressed bar for coaction with said ratchet, a third shaft mounted in said frame, a motor for rotating said third shaft, first, second and third cams on said third shaft, one of said cams adapted to actuate said spring pressed arm, micro switches actuated by the other cam for controlling actuation of said cylinder, an agitator in said hopper driven from said third shaft, and means driven from said second shaft for controlling the intermittent movement of the plates and for selectively halting the plates when the packets are below the discharge spouts, whereby when the plates are selectively halted, the body piece is reciprocated so that the chambers are aligned with the discharge spouts, and measured charges of products are dispensed into said packets.

References Cited
UNITED STATES PATENTS

| | | | |
|---|---|---|---|
| 740,735 | 10/1903 | Blake | 141—185 |
| 1,015,995 | 1/1912 | Cooley | 141—185 |
| 3,024,746 | 3/1962 | Hildman | 198—135 |
| 3,106,947 | 10/1963 | Logan | 222—361 |

LAVERNE D. GEIGER, *Primary Examiner.*

E. J. EARLS, *Assistant Examiner.*